UNITED STATES PATENT OFFICE.

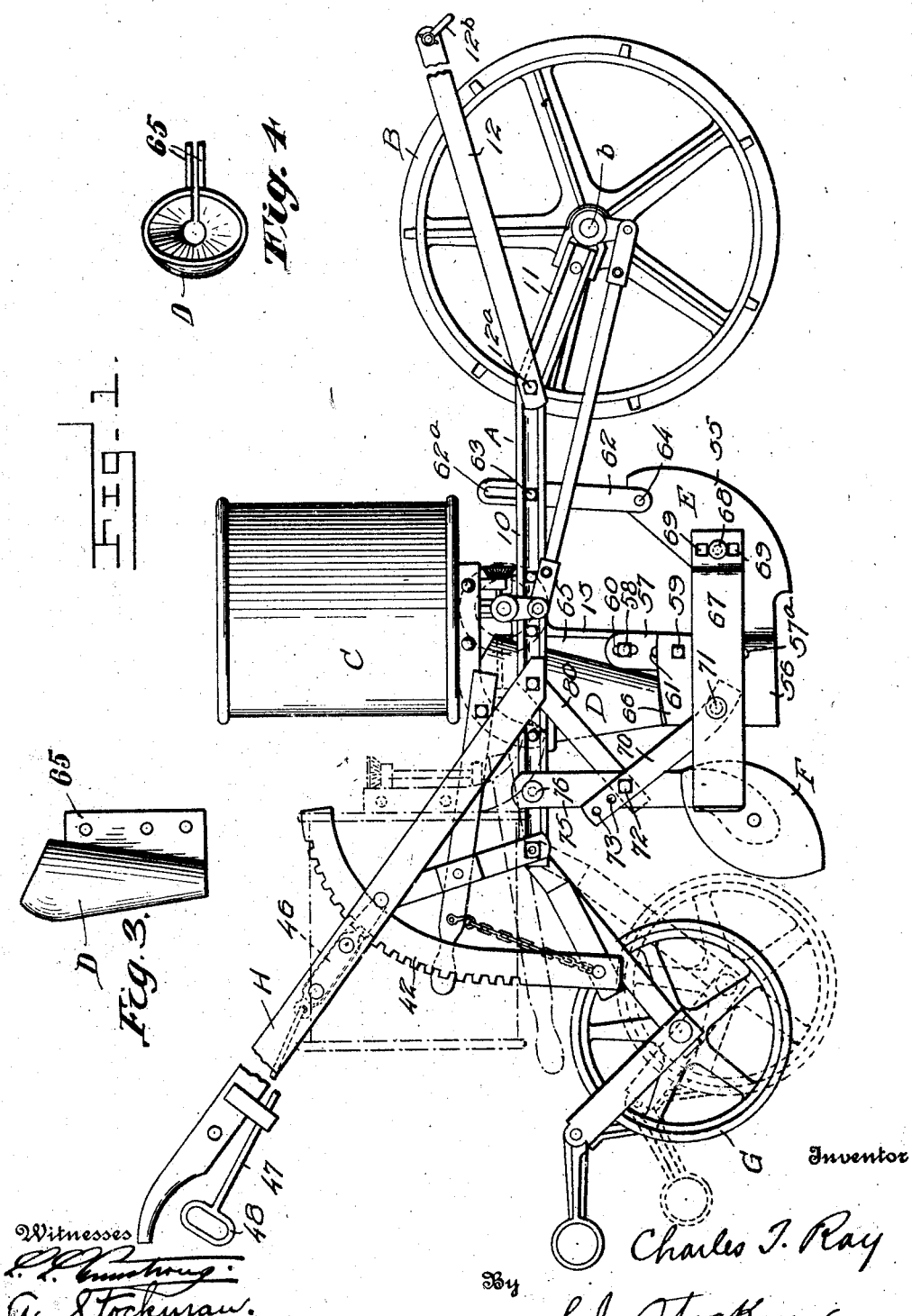

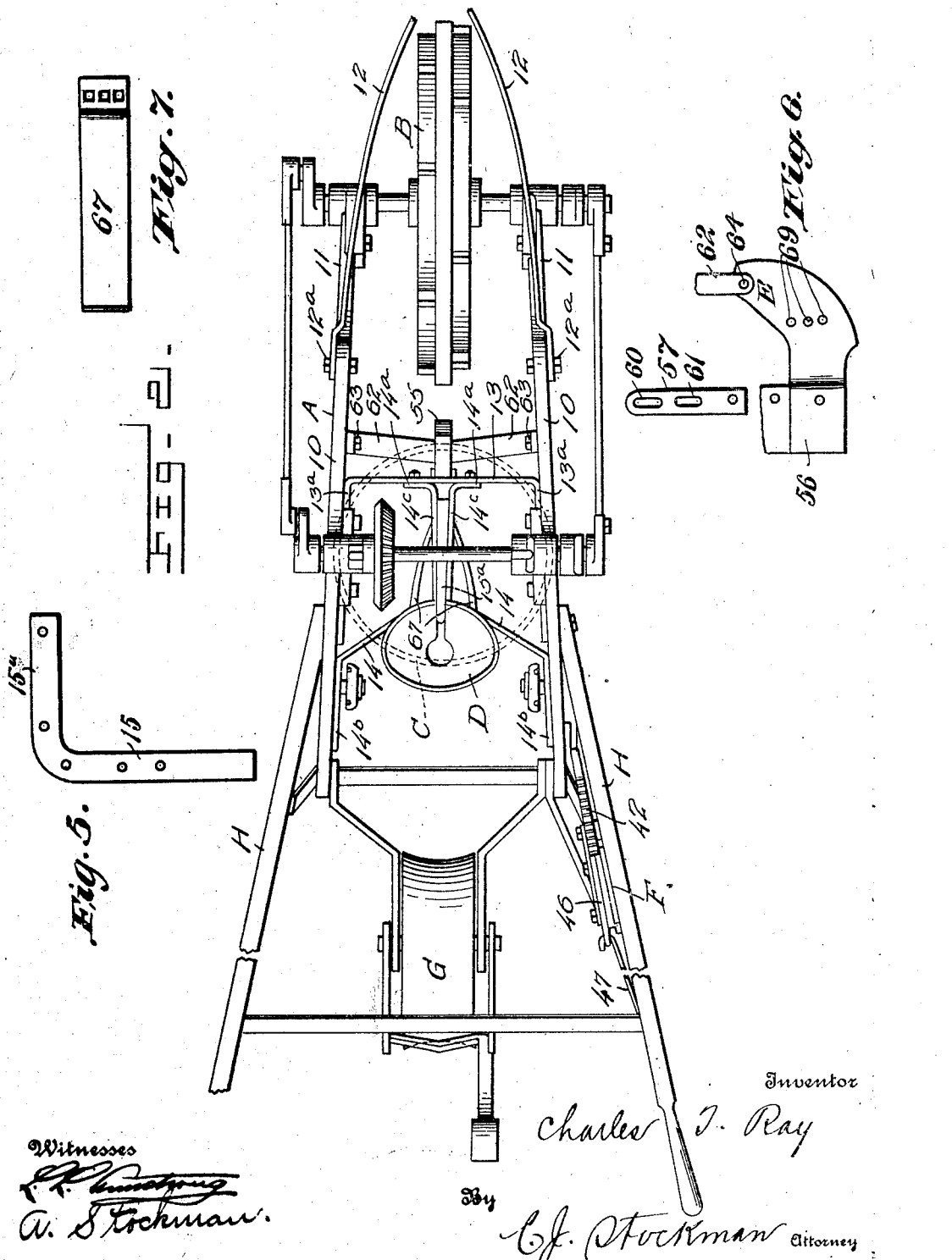

CHARLES T. RAY, OF LOUISVILLE, KENTUCKY, ASSIGNOR TO B. F. AVERY & SONS, OF LOUISVILLE, KENTUCKY, A CORPORATION OF KENTUCKY.

PLANTER.

1,171,884.   Specification of Letters Patent.   Patented Feb. 15, 1916.

Original application filed February 25, 1911, Serial No. 610,722. Divided and this application filed November 29, 1911. Serial No. 663,133.

*To all whom it may concern:*

Be it known that I, CHARLES T. RAY, a citizen of the United States, residing at Louisville, in the county of Jefferson and State of Kentucky, have invented new and useful Improvements in Planters, of which the following is a specification.

The present application is a division of my application for Letters Patent of the United States, filed February 25, 1911, Serial No. 610,722, and it has particular reference, in a planter or the like, to a frame construction carrying ground treating means.

The invention consists in peculiarities in the construction and arrangement of parts and novel combinations of elements, shown in the accompanying drawings and pointed out hereinafter.

The objects and advantages of the present invention will be understood from the hereinafter description.

I have illustrated in the accompanying drawings what is at present regarded to be the best detail embodiment of a planter provided with the means constituting the present invention, but it is to be understood that changes may be made in the details of the parts without departing from the spirit of the invention or the scope of the subjoined claims.

In the drawings: Figure 1 is a side elevation: Fig. 2 is a plan view of a planter embodying the present improvements: Fig. 3 is a detail view of the seed chute, in side elevation: Fig. 4 is a plan view of the said chute: Fig. 5 is a detail view of the standard: Fig. 6 is a detail view of the furrow opener and one of the arms which connect the opener to the standard, the opener and arm being shown separated from each other: and Fig. 7 is a detail view of one of the scrapers.

The same characters of reference are used to denote the same parts in all the views.

A designates the frame, B the front wheel, C the hopper, D the seed chute, E the furrow opener, F the seed coverer, G the rear or press wheel or roller, and H H the handles, of a planter selected to exemplify the present invention.

The frame comprises two longitudinal members 10, 10 which are preferably formed of I-bars, as shown, but they may be of other channel or flanged bars, or of straps or plane-bar form, if desired. In this particular exemplification of the invention, a front wheel is employed and in such event bearings for the axle $b$ thereof are provided preferably in frame-members, marked 11, 11 which depend from the members 10, 10 and are exemplified as being integral with the latter. The members 10 are provided with forwardly-converging draft-bars 12, 12 which are preferably pivoted thereto at their rear ends $12^a$ and provided with a draft eye $12^b$ at their front ends. A bar, marked 13, is shown as extending transversely of the frame, intermediate of the length thereof, and as connecting the members 10, 10 with each other. This bar has flanged ends, marked $13^a$, which are securely fastened to the members 10. A pair of straps, 14, 14 having flanged or laterally-bent forward ends $14^a$ secured to the strap 13 and flanged rear ends $14^b$ secured to the members 10, are bent to extend diagonally toward each other from their rear ends and thence forward in a substantially parallel spaced relation.

From the foregoing it will be apparent that the frame described, while it is of simple and inexpensive construction, has its members so disposed as to provide a well braced structure capable of sustaining all side drafts and torsional strains.

15 designates a standard which is attached to and supports the furrow opener E and is provided with a forwardly bent upper end $15^a$ which occupies the space between the parallel portions $14^c$ of the straps 14 and is suitably secured thereto so as to be supported thereby.

The furrow opener E herein exemplified comprises the blade or cutting portion 55 and diverging wings 56. It is adjustably connected to the standard 15 by means of arms 57 which are arranged on opposite sides of the standard and are secured to the opener at $57^a$ and are also attached to the standard by bolts 58 and 59, elongated openings 60 and 61, herein exemplified as being formed in the arms, or other suitable means, serving to permit adjustment of the arms and opener relatively to the standard. The front end of the opener is adjustably supported from the frame by arms 62, 62 whose upper ends are adjustably secured to the frame members 10 at 63, 63 and whose lower ends are pivoted to the cutting portion or blade of the opener at 64. Adjustment of the arms 62 relatively to the frame of the planter is permitted by the slots 62ᵃ in said arms. The arms 57 also serve as means for securing the seed chute D to the standard; said chute having spaced flanged forward ends 65 which are disposed on opposite sides of the standard and are clamped thereto by said arms and the fastening bolts 58 and 59. Seed protectors or dirt shields 66 at the mouth of the chute D are secured to the standard by the bolt 59, which extends therethrough as clearly shown in Fig. 1.

67 designates scrapers which level the top of the row or bed and sweep trash therefrom. They extend convergently forward and their front ends are suitably secured to the opener E, at opposite sides of the latter, preferably adjustably. As herein shown a bolt 68 adapted to any one of a suitable number of apertures 69 in the scrapers, forms a desirable means for connecting the forward end of the scrapers to the opener. The rear portions of the scrapers are suspended, by arms 70 connected thereto at 71, from standards 75 which support the coverer blades F, herein shown as being of the spoon type. The upper ends of the arms 70 are shown as being attached to the standard by means of a bolt 72 adapted to any one of a number of apertures 73 in said arms, this forming a desirable means by which said arms are adjustably supported. The standards 75 extend from the frame members 10, to which they are suitably connected as indicated at 76, and they are braced by inclined arms, 80, which also extend from said frame members and are secured to the standards, preferably by the bolts 72, hereinbefore referred to.

The construction described provides a very desirable means, whose details may, however, be varied within wide limits without departing from the spirit of the invention, by which the furrow is opened and retained in open position until after the seed is deposited, and by which the seed is delivered directly to the furrow close to the seed bed and is protected against being dissipated by the wind, and by which the opener may be set in a number of different positions with respect to the frame and is fixedly held in its adjusted position.

The rear wheel G is preferably supported by a carrier which is fulcrumed to the frame of the planter so as to be adjustable to regulate the height of the frame, and is held in its adjusted position by means of relatively movable interengaging members, as a rack bar 42 and a spring pressed pawl 46, the latter of which has an actuating element, as the rod 47 with its grip 48, arranged adjacent to the grip portion of one of the handles H so that the user may, when grasping the handle to raise the lower frame, at the same time release the pawl from the other member of the locking means whereupon, when the frame is raised, the carrier will automatically assume a position at a different angle from that previously occupied by it with respect to the frame. These parts are fully disclosed and claimed in my applications Serial No. 610,722 and Serial Number 835,009, filed April 28, 1914, to which reference may be had for further information relative thereto. It will be understood that after the opener is set in a predetermined position with respect to the frame, the further adjustment of the planter for deeper or shallower planting is accomplished by the adjustment of the rear wheel g.

Having now described the invention what I believe to be new and desire to secure by Letters Patent, is:—

1. In a machine of the class described; a frame, an opener standard secured to the frame, an opener, a bar having a plurality of alined slots positioned against the standard, bolts passing through the bar and standard to lock the bar in adjusted position, and a pivotal connection between the bar and opener.

2. In a machine of the class described; a frame, an opener standard secured to the frame and depending therefrom, a sword opener having rearwardly divergent portions, bars each bearing against a respective side of the standard and each having a plurality of alined slots, bolts passing through the slots and through the standard, pivotal connections between respective divergent portions of the opener and the bars, a link pivoted to the forward end of the opener, and means for adjustably connecting the link to the frame.

3. In a machine of the kind described, a frame and bracing and stiffening means therefor, the bracing and stiffening means comprising longitudinal members which are fixedly connected with the frame and have portions which extend approximately parallel with each other, an opener standard having members arranged at an angle with each other, one of said members being arranged between the approximately parallel portions of the bracing and stiffening means, the other member depending from the first-mentioned member of the standard, an opener and supporting arms adjustably mounted on the standard and connected to the opener.

4. In a machine of the kind described, a frame and bracing and stiffening means therefor, the bracing and stiffening means comprising longitudinal members which are fixedly connected with the frame and have portions which extend approximately parallel with each other, an opener standard having members arranged at an angle with each other, one of said members being arranged between the approximately parallel portions of the bracing and stiffening means, the other member depending from the first-mentioned member of the standard, an opener whose forward end is supported from the frame, and means for adjustably connecting the opener rearward of its forward end to the standard.

5. In a machine of the kind described, a frame and bracing and stiffening means therefor, the bracing and stiffening means comprising longitudinal members which are fixedly connected with the frame and have portions which extend approximately parallel with each other, an opener standard having members arranged at an angle with each other, one of said members being arranged between the approximately parallel portions of the bracing and stiffening means, the other member depending from the first-mentioned member of the standard, an opener having members projecting rearward from the front portion thereof, means for connecting said members adjustably to the standard, and adjustable supporting means supported from the frame and respectively connected to said members and the front portion of the opener.

6. In a machine of the kind described, a frame and bracing and stiffening means therefor, the bracing and stiffening means comprising longitudinal members which are fixedly connected with the frame and have portions which extend approximately parallel with each other, an opener standard having members arranged at an angle with each other, one of said members being arranged between the approximately parallel portions of the bracing and stiffening means, the other member depending from the first-mentioned member of the standard, an opener, and means for supporting the opener comprising an adjustable arm connected to the standard and opener and an adjustable arm connected to the frame and opener.

7. In a machine of the kind described, a frame comprising longitudinal members and bracing and stiffening means therefor, the bracing and stiffening means comprising longitudinal members which are fixedly connected with the first-mentioned members and have portions extending convergently for a part of their length and approximately parallel with each other, for another part of their length, an opener standard having members arranged at an angle with each other, one of said members being secured between the approximately parallel portions of the bracing and stiffening means, an opener, and means for adjustably securing the opener to the other member of the standard.

8. In a machine of the kind described, a frame comprising longitudinal members and bracing and stiffening means therefor, the bracing and stiffening means comprising longitudinal members which are fixedly connected with the first-mentioned members and have portions extending convergently for a part of their length and approximately parallel with each other for another part of their length, an opener standard having members arranged at an angle with each other, one of said members being secured between the approximately parallel portions of the bracing and stiffening means, an opener whose forward end is connected to the frame and means for adjustably securing the portion of the opener rearward of its said forward end to the lower member of the opener standard.

9. In a machine of the kind described, a frame comprising longitudinal members and bracing and stiffening means therefor, the bracing and stiffening means comprising longitudinal members which are fixedly connected with the first-mentioned members and have portions extending convergently for a part of their length and approximately parallel with each other for another part of their length, an opener standard having members arranged at an agle with each other, one of said members being secured between the approximately parallel portions of the bracing and stiffening means, an opener, means for adjustably securing the forward end of the opener to the frame and means for adjustably securing the portion of the opener rearward of its said forward end to the lower member of the opener standard.

In testimony whereof I have hereunto set my hand in presence of two subscribing witnesses.

CHARLES T. RAY.

Witnesses:
W. J. HUNGARLAND,
F. M. REDDING.